A. MERRILL.
Improvement in Cultivators.

No. 127,785.  Patented June 11, 1872.

Witnesses:
A. W. Almqvist
Geo. W. Mabee

Inventor:
A. Merrill
per Munn & Co.
Attorneys.

127,785

UNITED STATES PATENT OFFICE.

ABEL MERRILL, OF INGERSOLL, CANADA.

IMPROVEMENT IN CULTIVATORS.

Specification forming part of Letters Patent No. 127,785, dated June 11, 1872.

Specification describing a new and useful Improvement in Cultivators, invented by ABEL MERRILL, of Ingersoll, in the county of Oxford, Province of Ontario, and Dominion of Canada.

Figure 1:
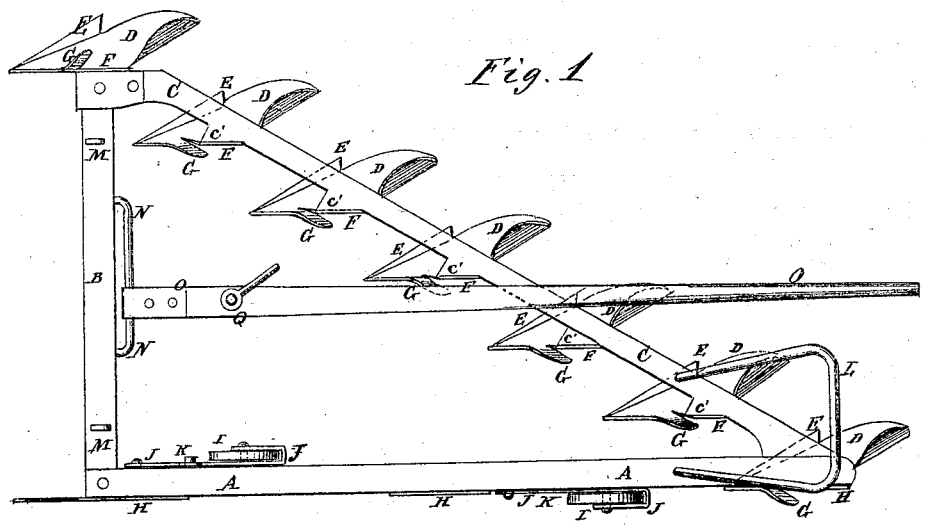
Figure 2:
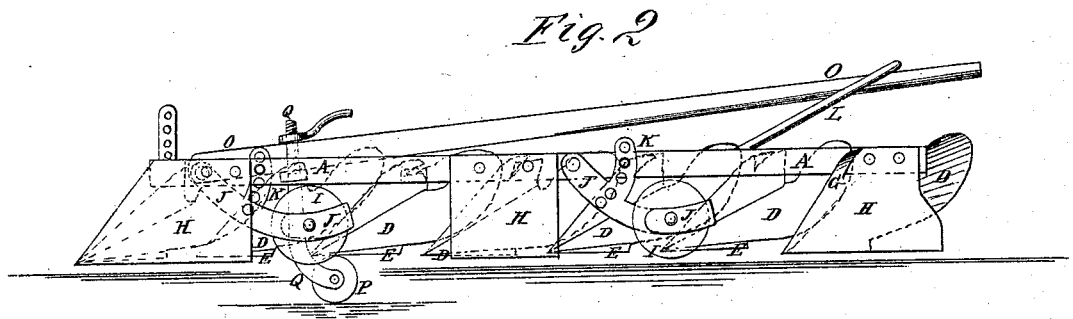
Figure 3:
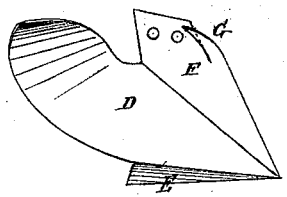
Figure 4:

Figure 1 is a top view of my improved cultivator. Fig. 2 is a side view of the same. Fig. 3 is a detail view of one of the teeth or plows. Fig. 4 is a detail view of a plow-colter illustrating my invention.

Similar letters of reference indicate corresponding parts.

My invention has for its object to furnish an improved cultivator, which shall be light, easily drawn, and shall have short teeth, and which shall at the same time not be liable to choke or jump out of or over the ground, but will run steady and smooth; and it consists in the construction and combination of various parts of the cultivator, as hereinafter more fully described.

A B C is the frame of my improved cultivator. The bar or beam A is in line with the line of draft. The beam B is at right angles with the line of draft. The beam C is inclined, its forward end being attached to the end of the beam B, and its rear end being attached to the rear end of the beam A. The beam C is made with offsets or shoulders $c'$, the faces of which are in line with the line of draft, and the plows D are attached directly to said beam. When the frame A B C is made of iron the beam C may be bent into zigzag shape to bring the parts $c'$, to which the plows D are attached, into line with the line of draft. The lower edge of the plows D is bent outward to form a share, E. The inner edge of the plow D is bent upward to serve as a standard, F, and is attached directly to the side of the beam C. The forward edge of the part F serves as a colter, and is inclined, as shown in Figs. 1, 2, and 3, so that rubbish encountered by the plow may slide up said inclined edge. The forward part of the upper edge of the part F of the plow projects in front of the shoulders $c'$ of the beam C, and is notched or slit, as shown in Figs. 1, 2, 3, and 4, to form a guard, G, which is bent to one side, so that the rubbish that slides up the part F may be guided to one side and may thus pass away from the plow without choking or obstructing it. This construction enables the plows or teeth to be made short, and at the same time effectually prevents them from becoming choked or clogged. The guard G may be formed upon other plows or upon colters, as shown in Fig. 4, with equal facility and advantage. H are plates of steel, which are attached to the land-side of the beam A, and which enter the ground and serve to keep the machine in a straight line with the line of draft. The forward edge of the plates H may be made vertical, as shown in the central plate, or inclined, as shown in the forward plate, or inclined and provided with a guard, G, as shown in the rear plate. I are wheels, which are pivoted to the supports J, the upper ends of which are pivoted to the beam A. The supports J are provided with curved arms K, which are secured to the beam A by a bolt or pin. The arms K have several holes formed in them to receive the said bolt or pin, so that the wheels I may be adjusted to serve as gauge-wheels to regulate the depth at which the plow is required to work in the ground, or to support the plows away from the ground, when required, for passing from place to place. To the rear parts of the beams A B are attached handles L for guiding and handling the cultivator. To the forward beam B are attached uprights M for the attachment of the draft, several holes being formed in said uprights, so that the line of draft may be adjusted higher or lower, as may be required. To the rear side of the beam B is attached a long staple or bar, N, to which is pivoted and upon which slides the forward end of the lever O, the rear end of which projects back into such a position that it may be conveniently reached and operated by the plowman. P is a wheel, which should be a caster-wheel, and the standard Q of which should be so connected with the forward part of the lever O that the wheel P may be raised and lowered, as may be desired. By this construction, by pressing the rear end of the lever O downward the plows may be raised from the ground for convenience in turning or passing from place to place.

Having thus described my invention, I claim as new and desire to secure by Letters Patent—

1. The plows D E F G, constructed substantially as herein shown and described, to adapt them for attachment directly to the side of the beam, as and for the purpose set forth.

2. A gang of plows, D, arranged in the diagonal beam C, combined, as described, with one or more plates, H, arranged on the draft-beam A, and entering the ground to counteract strain against the line of draft.

3. The combination of the long staple or bar N, lever O, wheel P, and adjustable support Q with the front beam B of the frame A B C, substantially as herein shown and described, and for the purpose set forth.

ABEL MERRILL.

Witnesses:
WM. BERASHE,
JNO. CRAWFORD.